United States Patent

[11] 3,622,461

[72] Inventors Otto Wagner
Wuppertal-Elberfeld;
Klaus Bauer, Wuppertal-Elberfeld;
Wilfried Kaufmann, Wuppertal-Vohwinkel; Erich Rauenbusch, Wuppertal-Elberfeld; Alfred Arens, Wuppertal-Elberfeld; Eckart Irion, Wuppertal-Elberfeld, all of Germany
[21] Appl. No. 787,195
[22] Filed Dec. 26, 1968
[45] Patented Nov. 23, 1971
[73] Assignee Farbenfabriken Bayer Aktiengesellschaft
Leverkusen, Germany
[32] Priorities May 6, 1968
[33] Germany
[31] P 17 67 390.4;
May 16, 1968, Germany, No. P 17 67 498.5

[54] PROCESS FOR THE EXTRACTION OF L-ASPARAGINASE
4 Claims, No Drawings

[52] U.S. Cl..................................................... 195/66 A
[51] Int. Cl....................................................... C07g 7/028
[50] Field of Search............................................ 195/66 A

[56] References Cited
UNITED STATES PATENTS
3,440,142 4/1969 Teller........................... 195/66
3,511,754 5/1970 Berk............................. 195/66

*Primary Examiner*—Lionel M. Shapiro
*Attorney*—McCarthy, Depaoli & O'Brien

ABSTRACT: From a culture of *E. coli* the bacterial mass is flocculated by addition of an organic base or a salt thereof having an amino function and a molecular weight above 1,000. The flocculated cells are centrifuged, resuspended in water and precipitated by a water-miscible solvent, such as acetone. The cells which are simultaneously opened by the previous step are centrifuged away and again resuspended in water, whereby the enzyme is extracted from the cells. By addition of the organic base, mentioned above, to the suspension, the extracted cells, nucleic acids and ballast proteins are precipitated and are removed by centrifugation. The L-asparaginase is precipitated from the cell-free solution by addition of acetone.

PROCESS FOR THE EXTRACTION OF L-ASPARAGINASE

The present invention is directed to a process for obtaining the enzyme L-asparaginase and, more particularly, to a process for extracting L-asparaginase from bacterial cells, said process being suitable for application on an industrial scale.

L-asparaginase is a known enzyme capable of splitting the amide bond in L-asparagine hydrolytically and is of importance medically for the combating of malignant tumors which require L-asparagine in their growth. It is being used clinically at an ever increasing rate although, prior to this invention, there has been no possibility of supplying the large quantities required [Proc. N.A.S. 56, 1516–19 (1966)].

L-asparaginase is known to occur intracellularly in *Escherichia coli* (*E. coli*) and there have been techniques disclosed in the prior art for obtaining said enzyme from *E. coli*. One method of obtaining said enzyme is disclosed by H. A. Campbell et al., Biochemistry 6 (1967), pages 721–730, and said method involves crushing the bacterial cells of *E. coli* (ATCC 11303) by ultrasonics or grinding with aluminum oxide in order to liberate the enzyme, elimination of the cell fragments and of nuclei acids through precipitation with manganese chloride and subsequent centrifuging, salting out of the raw enzyme from the supernatant solution with ammonium sulfate, dialysis and further purification through chromatography on DEAE-cellulose columns.

The growing of *E. coli* cells is also known in the art and can be carried out in various nutrient media such as in nutrient bouillon, peptone solutions, on Trypticase Soy Agar and in a nutrient solution of the Dehydrated Bacto-Nutrient Broth 0.8 percent, glucose 1 percent, disodium hydrogen phosphate 0.6 percent, and potassium dihydrogen phosphate 0.3 percent (H. A. Campbell, L. T. Mashburn E. A. Boyse, L. J. Old, Biochemistry 6, 1967, pages 720–730; J. Roberts, M. D. Prager, N. Bachynsky, Cancer Research 26, 1966, pages 2213–2217.

The prior art methods for the recovery of L-asparaginase from *E. coli* have been found to be extremely unsuitable for the production of L-asparaginase in the quantities required for present clinical demands and, therefore, are inapplicable for industrial application. Furthermore, the resulting products of the prior art methods have been found to include contaminates having undesirable pyrogenic side effects and elaborate procedures must be taken in order to remove pyrogenic components.

It has now been discovered that L-asparaginase can be produced on a technical scale, and with extremely good yields by a novel technique which has for its essential step the precipitation of *E. coli* cells with an organic base of a salt thereof having an amino function and a molecular weight above 1,000.

For reasons which are not completely understood, it appears that organic bases or salts thereof having an amino function and a molecular weight above 1,000 act upon the *E. coli* cells causing them to flocculate and thereby rendering them easy to remove by conventional centrifuging.

In a typical method for the recovery of L-asparaginase from *E. coli*, a nutrient solution is inoculated with *E. coli* and the bacterial cells grown in a conventional manner. The grown cells are then treated with an organic base or salt thereof having an amino function and a molecular weight above 1,000 in order to flocculate the cells and precipitate them. The precipitated cells are then centrifuged, resuspended in water and treated with an organic solvent which is miscible or partly miscible in water such as acetone which serves to simultaneously open up the cells and precipitate them. The precipitated cells are then recovered by conventional means such as centrifuging. The cells are then resuspended in water which also extracts from them the L-asparaginase. The cells are again removed by filtration or centrifugation, preferably after the addition of more of the organic base previously mentioned, and the L-asparaginase recovered from the aqueous solution by the addition of a water miscible solvent such as acetone.

Instead of acetone, other organic solvents that are miscible or partly miscible with water can be used for the opening of the bacterial cells of *E. coli* and for the precipitation of L-asparaginase subsequent to the treatment with the organic bases or salts thereof. Suitable organic solvents would include alcohols, e.g., methanol, ethanol, isopropanol, etc.; ketones, e.g., methyl ethyl ketone; dimethyl sulfoxide, etc.

*Escherichia coli* ATCC 9637 was used as the organisms in the typical procedure referred to. All other *Escherichia coli* strains are usable however, for example, *Escherichia coli* ATCC 4157, 8677, 9739, 9723, 10536, 10586, 11105, 11126, 11303, 12142, 12408, 12911, 13676, 13762, 14948.

It was observed, however, that the procedures heretofore disclosed for the growing of *E. coli* cells resulted in the production of weak L-asparaginase activity. It was discovered, however, that bacterial cells of high enzymatic activity could be obtained by the addition of suitable organic acids as a C-source to the nutrient solutions. Corn steep liquor solutions represent an outstanding example of a suitable C-source. Still a more preferred procedure, however, is to increase the concentration of lactic acid which is present in the corn steep liquor and to add supplemental ammonium ions. Succinic acid, fumaric acid or 1-malic acid can be used instead of lactic acid. Additions of carbohydrates fermentable by *E. coli*, for example, glucose, fructose, mannose, maltose, galactose, etc. or the amino acids dl-valine, dl-serine, l-cysteine, l-tryptophan of dl-novvaline cause a repression; additions of 1-glutamic acid, 1-aspartic acid, dl-alanine and glycocoll on the other hand promote the synthesis of L-asparaginase.

Additionally, yeast extract is well suited as basis for the nutrient solutions resulting in improved yields of L-asparaginase.

The following nutrient solutions were found to be exceptionally well suited for growing *E. coli*:

| | | |
|---|---|---|
| 1. Corn steep liquor | | |
| (calculated on dry substance) | 1.50% | |
| Sodium lactate | 0.60% | pH 7.0 |
| $(NH_4)_2SO_4$ | 0.20% | |
| 2. Corn steep liquor | | |
| (calculated on dry substance) | 1.50% | |
| Sodium lactate | 0.30% | |
| l-glutamic acid–Na | 0.15% | pH 7.0 |
| glycocoll | 0.15% | |
| $(NH_4)_2SO_4$ | 0.20% | |
| 3. Yeast extract | 2.00% | |
| Sodium lactate | 1.00% | pH 7.0 |
| $(NH_4)_2SO_4$ | 0.20% | |

These nutrient solutions were inoculated with agar slant cultures of *E. coli* ATCC 9637 and cultivated for about 20 hours on the shaking machine at 30° C. The pH value of the cultures rose during this time to 8.5–8.9.

The same results were obtained by the transfer of these working conditions to the technical fermenting scale.

An organic base with a molecular weight above 1,000 or its salt is added to the culture broth, whereby the cells become flocculated and are easily centrifuged. After resuspension of the cells in water, these are again precipitated through the addition of acetone. The cells are thereby opened and so changed that the L-asparaginase formed can be dissolved out with water in the next step. This consists in the renewed separation by centrifuging, renewed resuspension and extraction with water. From this suspension the extracted cells, nucleic acid and ballast proteins are precipitated by the addition of one of the above-mentioned organic bases and removed by centrifuging. The L-asparaginase can be precipitated from the remaining aqueous solution by the addition of much acetone. Instead of acetone, other organic solvents that are miscible or partly miscible with water can be used.

As has been pointed out, compared with the methods hitherto known, the method of the invention surprisingly has the great advantage of delivering L-asparaginase in practically pyrogen-free condition. The organic base or salt thereof having a molecular weight above 1,000 and possessing an amino function can be any of a wide variety of materials, either naturally occurring or of synthetic origin. A particularly preferred base is Retaminol which is a high molecular weight product of the general formula:

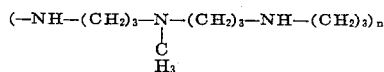

with a molecular weight above 1,000. Retaminol can be prepared by the reaction of di-(3-amino-n-propyl)-methylamine with epichlorohydrin.

The following examples will illustrate the best mode now contemplated for carrying out this invention.

EXAMPLE

In the following example the compound Retaminol refers to a high molecular product of the general formula.

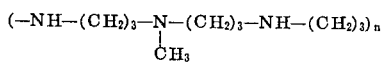

with a molecular weight above 1,000, which is formed by reaction of di-(3-amino-n-propyl)-methylamine with epichlorohydrin.

OPERATION 1

Ten percent corn steep liquor (calculated on dry substance) is adjusted with 2N potash lye to pH 7.0, heated for 20 minutes to 120° C. and after cooling clarified in the overflow centrifuge or through a Seitz filter. Thirty liters of this clear corn water solution are diluted with 170 liters tap water. For the preparation of the above-described nutrient solution 1, 1.2 kg. sodium lactate and 0.4 kg. ammonium sulfate are added; for the preparation of nutrient solution 2, 0.6 kg. sodium lactate, 0.3 kg. 1-glutamic acid-Na, 0.3 kg. glycocoll and 0.4 kg. ammonium sulfate.

The nutrient solution obtained is sterilized in a fermenter 40 minutes at 110° C., subsequently cooled, and then inoculated with 500 cc. of a shake culture of *Escherichia coli* ATCC 9637 grown for 18 hours at 30° in a nutrient solution of 1.5 percent yeast extract and 0.5 percent sodium lactate, pH 7.0. The fermentation is run at 30° C. with 80 liters air per minute at 150 r.p.m. of the agitator.

OPERATION 2

After a growing time of 16–18 hours, when the pH of the culture has risen to about 8.8, the culture broth is cooled to about 20° C. The bacteria containing L-asparaginase are flocculated by the addition of 1.0 liter of a 2.5 weight percent Retaminol solution, separated in the overflow centrifuge and resuspended with tap water to a volume of 20 liters.

OPERATION 3

Into the cell suspension obtained in operation 2, 80 liters acetone is poured with stirring, 20 cc. of 2.5 percent Retaminol solution added, precipitated bacteria separated off in the overflow centrifuge and the cell mass again resuspended to 20 liters with tap water.

OPERATION 4

For extraction of the L-asparaginase from the bacteria cells, the suspension prepared in operation 3 is stirred 4.5 hours at 30° C. During this time the pH is kept at pH 7.5 to 7.8 by additions of 1N soda lye or 10 percent acetic acid respectively. It is subsequently cooled to about 20° C.

OPERATION 5

Into the cell suspension extracted according to operation 4, 2.5 liters of 1.5 percent Retaminol solution is poured and the resulting heavy precipitate consisting of extracted bacteria and insoluble Retaminol nucleic acid protein complex is separated off in the overflow centrifuge. The precipitate is discarded. About 17 liters of a clear solution are obtained, in which, among other substances, L-asparaginase is present.

OPERATION 6

From the solution obtained in operation 5, crude L-asparaginase is precipitated by the addition of 68 liters acetone. The precipitate obtained is isolated, rewashed with acetone and vacuum dried at 25°–30° C. About 100 grams of crude L-asparaginase is obtained with an L-asparaginase activity of about 3.3 (with the use of nutrient solution 1) respectively 4.0 to 4.5 international units per mg. (with the use of nutrient solution 2). With the use of nutrient solution 3, the crude L-asparaginase contains about 2.5 international units per mg.

The determination of the raw L-asparaginase activity referred to above was made in accordance with the following procedure which is more fully set forth in *Cancer Research* 26, 1966, pp. 2,013–2,017.

15.0 cc. nutrient solution is centrifuged. The remaining solution is discarded. The bacteria cells are resuspended to a volume of 15.0 cc. with double distilled $H_2O$. 3.0 cc. of this cell suspension are diluted with 12.0 cc. double distilled $H_2O$ and mixed with 15.0 cc. 2 percent L-asparagine solution in 1/10 molar phosphate buffer solution at 7.0 pH followed by addition of 0.2 cc. toluene.

The reaction mixture so prepared, which now contains 1.0 percent L-asparagine is shaken for 3 hours under rubber stopper closure at 30° C. After this mixture is heated 5 minutes to 100° C., it is again cooled and centrifuged clear. The remaining solution is used for colorimetric $NH_3$-nitrogen determination with Nessler's reagent against standard ammonium sulfate solutions.

To obtain a measure for the relative L-asparaginase activity of the *E. coli* cells, the colorimetrically determined N-concentration is multiplied by the dilution factor of the bacteria cell concentration present in the test reaction mixture. Thus, the relative L-asparaginase activity of the cells grown in nutrient solution 1 amounts to 0.025 to 0.04×10=0.25 to 0.4, that of the cells grown in nutrient solution 2, 0.035 to 0.065×10=0.35 to 0.65, and that of the cells grown in nutrient solution 3, 0.04×6=0.24.

The L-asparaginase extracted according to the invention is to be used as pharmaceutical agent against neoplasms that require L-asparagine as growth substance. For such use it is advisable further to enrich or purify the L-asparaginase extracted according to the invention.

A method of enriching is disclosed and claimed in copending application Ser. No. 786,901, filed concurrently herewith.

What is claimed is:

1. A process for obtaining L-asparaginase which comprises (a) flocculating the bacterial cells of *Escherichia coli* by addition thereto of Retaminol, isolating the flocculated cells, resuspending the cells in water; (b) treating said suspension with a completely or partly water-miscible organic solvent, extracting the thus treated cells with water; (c) removing the extracted cells, nuclei acid, and ballast proteins; and (d) precipitating the L-asparaginase from the remaining solution by the addition of a completely or partially water-miscible solvent.

2. A process as defined in claim 1 wherein the organic solvent is acetone.

3. A process as defined in claim 1 wherein the *E. coli* culture is of *Escherichia coli* ATCC 9637.

4. In the process for the extraction of L-asparaginase from the cells of *Escherichia coli*, the improvement which comprises precipitating the cells from a suspension thereof by the addition of an organic base of the general formula

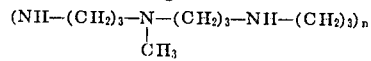

having a molecular weight above 1,000.

UNITED STATES PATENT OFFICE
CERTIFICATE OF CORRECTION

Patent No. 3,622,461　　　　　　　Dated November 23, 1971

Inventor(s) Otto Wagner and Klaus Bauer

It is certified that error appears in the above-identified patent and that said Letters Patent are hereby corrected as shown below:

(first occurrence)
Column 2, line 28, "of"/should be -- or --.

Column 3, line 75, "1.5" should be -- 2.5 --.

Column 4, line 60, "nuclei" should be -- nucleic --.

Signed and sealed this 6th day of June 1972.

(SEAL)
Attest:

EDWARD M. FLETCHER, JR.　　　　　ROBERT GOTTSCHALK
Attesting Officer　　　　　　　　Commissioner of Patents